UNITED STATES PATENT OFFICE.

JOHANNES FRIEDRICH PETER RINGSDORFF, OF ESSEN-ON-THE-RUHR, GERMANY.

PROCESS FOR THE PRODUCTION OF CARBON-COVERED METAL SHEETS FOR DYNAMO-BRUSHES.

No. 923,581.   Specification of Letters Patent.   Patented June 1, 1909.

Application filed July 14, 1908. Serial No. 443,480.

*To all whom it may concern:*

Be it known that I, JOHANNES FRIEDRICH PETER RINGSDORFF, a subject of the King of Prussia, and a resident of Kronprinzen-strasse, of Essen-on-the-Ruhr, in the German Empire, have invented a new and useful Process for the Production of Carbon-Covered Metal Sheets for Dynamo-Brushes and the Like, of which the following is an exact specification.

This invention relates to a method of producing the known carbon, preferably in the form of graphite, covered sheets of metal which are used in dynamo brushes or in the diaphragms of microphones. Heretofore it has been customary to cover the thin sheets of metal with carbon and then to prepare the sheet covered in this way for dynamo brushes. Such brushes however present the disadvantage that the carbon layers adhere poorly to the sheet. The loose adhesion between the carbon and the metal causes a bad electric conduction and damaging of the collectors. When brushes prepared in this way are subjected to a higher pressure such for example as takes place when forming the brushes out of a bundle of separate plates, the pressure causes the carbon to be scaled off or thinned in parts so that the layer does not preserve the necessary evenness.

According to the present invention the pulverized carbon preferably graphite may simply be applied in form of a paste which may be smeared over the metal sheets. When the carbon preferably graphite has been applied to the metal sheets and is in the proper dry condition, the sheets are subjected to high pressure, for example 100 to 1500 kg. per sq. cm. This is effected by means of rollers or hydraulic pressure. When thus prepared the carbon adheres firmly to the sheets which now are ready to to be worked up into dynamo brushes or membranes of microphones. Small sheets, coated as described may be directly formed into brushes and membranes. Carbon coated sheets thus prepared may be subjected to pressure during the manufacture of the dynamo brushes without showing any unevenness nor does any scaling of the carbon occur.

I claim as my invention:

1. The process of producing carbon covered metal sheets consisting in smearing a carbon paste on the surfaces of said metal sheets and subjecting them to high pressure.

2. The process of producing carbon covered metal sheets consisting in smearing a graphite paste on the surfaces of the sheets and subjecting them to hydraulic pressure.

In witness whereof I have hereunto set my hand in the presence of two witnesses.

JOHANNES FRIEDRICH PETER RINGSDORFF.

Witnesses:
PETER LIEBER,
WILHELM FLASCHE.